(12) United States Patent
Leman (10) Patent No.: US 9,080,563 B2
(45) Date of Patent: Jul. 14, 2015

(54) PUMP ROD CONNECTOR APPARATUS AND METHOD

(75) Inventor: Thomas C. Leman, Houston, TX (US)

(73) Assignee: Stoudt Oilfield Products, Inc., Houston, TX (US)

(*) Notice: Subject to any disclaimer, the term of this patent is extended or adjusted under 35 U.S.C. 154(b) by 1165 days.

(21) Appl. No.: 12/323,808

(22) Filed: Nov. 26, 2008

(65) Prior Publication Data

US 2010/0129142 A1    May 27, 2010

(51) Int. Cl.
F16B 9/00         (2006.01)
F04B 47/02      (2006.01)
E21B 43/12       (2006.01)
F16B 7/04         (2006.01)

(52) U.S. Cl.
CPC .............. *F04B 47/02* (2013.01); *E21B 43/127* (2013.01); *F16B 7/0426* (2013.01); *Y10T 403/16* (2015.01); *Y10T 403/32122* (2015.01); *Y10T 403/32155* (2015.01)

(58) Field of Classification Search
USPC ........... 403/338; 285/90, 404, 364, 406, 373, 285/419, 332, 332.1, 332.2, 332.3
See application file for complete search history.

(56) References Cited

U.S. PATENT DOCUMENTS

| | | | | |
|---|---|---|---|---|
| 2,303,032 A | * | 11/1942 | Dusevoir | 403/332 |
| 2,377,510 A | * | 6/1945 | Newell | 285/112 |
| 3,006,663 A | * | 10/1961 | Bowne | 285/233 |
| 3,544,138 A | * | 12/1970 | Von Eiff | 285/336 |
| 3,674,291 A | * | 7/1972 | Goldberg | 403/338 |
| 4,033,701 A | * | 7/1977 | Labyer et al. | 403/13 |
| 4,274,640 A | * | 6/1981 | Cook | 277/608 |
| 4,288,116 A | * | 9/1981 | Schlienger | 285/364 |
| 4,527,818 A | * | 7/1985 | Rundell | 285/148.17 |
| RE33,003 E | | 8/1989 | Dugan | |
| 4,927,181 A | * | 5/1990 | Ciotola | 285/15 |
| 5,904,071 A | | 5/1999 | Kennedy et al. | |
| 5,941,653 A | * | 8/1999 | Cipriani | 403/344 |
| 6,106,031 A | * | 8/2000 | Guginsky | 285/369 |
| 6,164,188 A | * | 12/2000 | Miser | 92/84 |
| 6,264,203 B1 | * | 7/2001 | Weems et al. | 277/314 |
| 6,302,452 B1 | * | 10/2001 | Schlicht | 285/363 |
| 6,305,719 B1 | * | 10/2001 | Smith et al. | 285/15 |
| 7,168,361 B1 | | 1/2007 | Blume | |
| 2006/0180020 A1 | | 8/2006 | Riley et al. | |
| 2006/0202480 A1 | * | 9/2006 | Cassel et al. | 285/408 |

* cited by examiner

*Primary Examiner* — Victor MacArthur
(74) *Attorney, Agent, or Firm* — Krueger Iselin LLP (57) ABSTRACT

A disclosed connector assembly for connecting abutting ends of a pair of rods includes a pair of outer clamp members, each adapted to receive one of two inner clamp members. Each inner clamp member has two opposed inner surfaces, each adapted to contact a corresponding shoulder of one of the rod ends. The assembly includes means for urging the outer clamp members toward one another. A described method for connecting the rod ends includes installing one of the inner clamp members in each of the outer clamp members and positioning the outer clamp members about the abutting ends of the rods such that the inner surfaces of the inner clamp members contact the corresponding shoulders. When the outer clamp members are urged toward one another, the inner surfaces of the inner clamp members impart forces on the corresponding shoulders that urge the ends of the rods toward one another.

16 Claims, 7 Drawing Sheets

PUMP ROD CONNECTOR APPARATUS AND METHOD

BACKGROUND

Hydrocarbons such as oil and natural gas are typically extracted from the earth via drilled wells. In a typical well drilling operation, a drill bit is attached to joined sections of drill pipe, positioned within a wellbore and set into rotational motion. As the drill bit rotates, it removes material from the bottom of the wellbore. A fluid referred to as "drilling mud" or simply "mud" is pumped through the drill pipe to remove the cut material from the drill bit and the wellbore. The drilling mud flows down the drill pipe, passes through the drill bit, and flows back up the wellbore around the drill pipe to the surface.

Large reciprocating pumps called "slush pumps" or "mud pumps" are typically used for pumping the drilling mud. Mud pumps must deliver drilling mud at relatively high flow rates in order to be effective. Because the drilling mud must also be pumped through thousands of feet of drill pipe, mud pumps typically operate at very high pressures.

Mud pumps are typically of modular construction and include a power end and a fluid end. The power end provides the power for the pump, typically from an internal combustion engine or an electric motor. The power end typically converts rotation motion of an engine or motor to reciprocating motion of an output shaft called an "extension rod." The designs of large reciprocating pumps have evolved over time, as indicated in U.S. patents numbered U.S. Pat. Nos. 5,616,009; 5,904,071; and 7,168,361, each of which is incorporated herein by reference in its entirety.

The fluid end of a mud pump typically includes components that interact with the drilling mud, such as pistons, cylinder liners, and valves. Drilling mud is often highly abrasive because even after filtering, it contains cut material from the bottom of the wellbore. As a result, moving parts of the fluid end that contact the drilling mud tend to wear relatively quickly, and are normally designed to be replaceable. The moving parts of the fluid end are often replaced at set intervals as part of a regular maintenance schedule, some as often as every few weeks.

The fluid end typically includes one or more pistons, each connected to one end of a piston rod. The other end of each piston rod is typically adapted for connection to an end of an extension rod from the power end. As described above, worn pistons and cylinder liners are typically replaced on a regular basis. To reduce mud pump down time, it is desirable that the replacement of worn pistons and cylinder liners be accomplished as quickly as possible.

In a typical mud pump, a removable connector assembly is used to connect an end of each piston rod to an end of a corresponding extension rod. During the frequent replacement of worn pistons and cylinder liners, the connector assemblies are first removed (to disconnect the ends of the piston rods from the ends of the extension rods), then reinstalled (to reconnect the ends of the piston rods to the ends of the extension rods). From time to time, when the connector assemblies are removed, they are found to be damaged (usually due to an incorrect last reinstallation) and must be replaced.

The ends of extension rods and piston rods of different models of mud pumps tend to have different configurations. As a connector assembly must mate properly with the ends of the extension rod and the piston rod, each mud pump model tends to require a different connector assembly. A problem arises in that a mud pump user having several different models of mud pumps must keep a sufficient number of the different connector assemblies on hand.

SUMMARY

The problems outlined above are at least in part addressed by a novel connector assembly for connecting ends of a pair of rods placed in abutting contact. The disclosed connector assembly includes a pair of outer clamp members and a pair of inner clamp members. Each of the outer clamp members is adapted to receive one of the inner clamp members. Each of the inner clamp members has a pair of opposed inner surfaces, where each of the inner surfaces is adapted to contact a corresponding shoulder of the end of one of the rods. The connector assembly includes means for urging the outer clamp members toward one another. When the inner clamp members are fit (i.e., installed) in the outer clamp members, the outer clamp members are positioned about the ends of the rods such that the inner surfaces of the inner clamp members contact the corresponding shoulders of the ends of the rods, and the outer clamp members are urged toward one another, the inner surfaces of the inner clamp members impart forces on the corresponding shoulders of the ends of the rods that urge the ends of the rods toward one another.

The pair of rods may include, for example, a substantially cylindrical extension rod and a substantially cylindrical piston rod of a reciprocating pump. The connector assembly may ensure that reciprocating movement of the extension rod is transferred to the piston rod.

The pair of outer clamp members may be configured to receive any one of multiple pairs of inner clamp members, where each of the pairs of inner clamp members is configured to connect abutting ends of pairs of pairs of rods having different configurations. Further, the connector assembly may be repaired by replacing the inner clamp members when the inner surfaces of one of the inner clamp members become damaged or worn.

The means for urging the outer clamp members toward one another may include, for example, one or more fasteners, latches, or hinges. Other means may be used to retain the inner clamp members within the outer clamp members.

A described method for connecting ends of a pair of rods includes installing an inner clamp member in each of a pair of outer clamp members. Each of the inner clamp members has opposed inner surfaces, and each of the inner surfaces is adapted to contact a corresponding shoulder of the end of one of the rods. The ends of the rods are placed in abutting contact, and the outer clamp members are positioned about the ends of the rods such that the inner surfaces of the inner clamp members are in contact with the corresponding shoulders of the ends of the rods. The outer clamp members are then urged toward one another.

BRIEF DESCRIPTION OF THE DRAWINGS

A better understanding of the various disclosed embodiments can be obtained when the detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
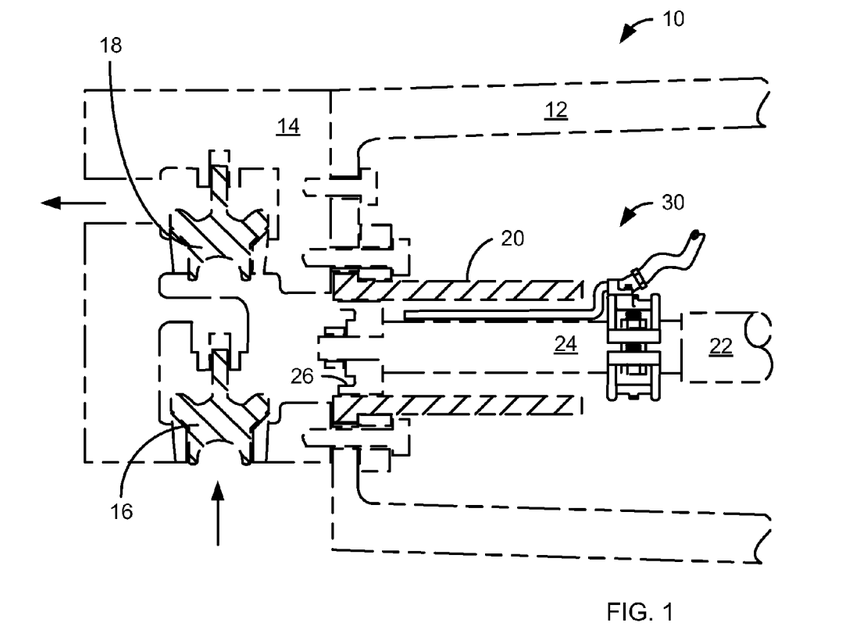
FIG. 1 is a cross-section view of a portion of a mud pump including an end of a frame of a power end of the mud pump connected to a fluid end module, where a connector assembly connects an end of an extension rod to and end of a piston rod.

The problems identified in the background are at least partly addressed by a pump rod connector apparatus and method disclosed herein. FIG. 1 is a cross-section view of a portion of a mud pump 10 including an end of a frame 12 of a power end of the mud pump 10 connected to a fluid end module 14. In FIG. 1, phantom lines are used to represent an illustrative context for the novel connector assemblies disclosed herein. The mud pump 10 of FIG. 1 includes one embodiment of a connector assembly 30 that connects an end of an extension rod 22 to an end of a piston rod 24 such that reciprocating motion of the extension rod 22 is transferred to the piston rod 24.

The power end of the mud pump 10 converts rotation motion (e.g., of an internal combustion engine or an electric motor) to the reciprocating motion of the extension rod 22. The fluid end of the mud pump 10 of FIG. 1 includes the piston 26, a cylinder liner 20, a suction valve 16, and a discharge valve 18. The piston 26 is connected to an end of the piston rod 24 opposite the end connected to the extension rod 22. During operation of the mud pump 10, the piston 26, driven by the piston rod 24, moves back and forth within the cylinder liner 20, alternately drawing fluid in through the suction valve 16 and forcing it out through the discharge valve 18.

Figure 2:
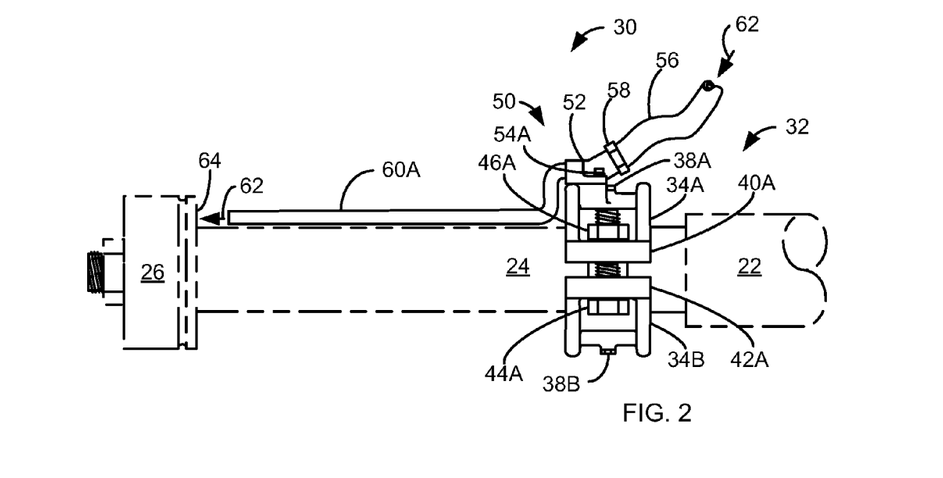
FIG. 2 is a side view of a portion of the mud pump of FIG. 1 including the connector assembly, the extension rod, and the piston rod.
Figure 3:
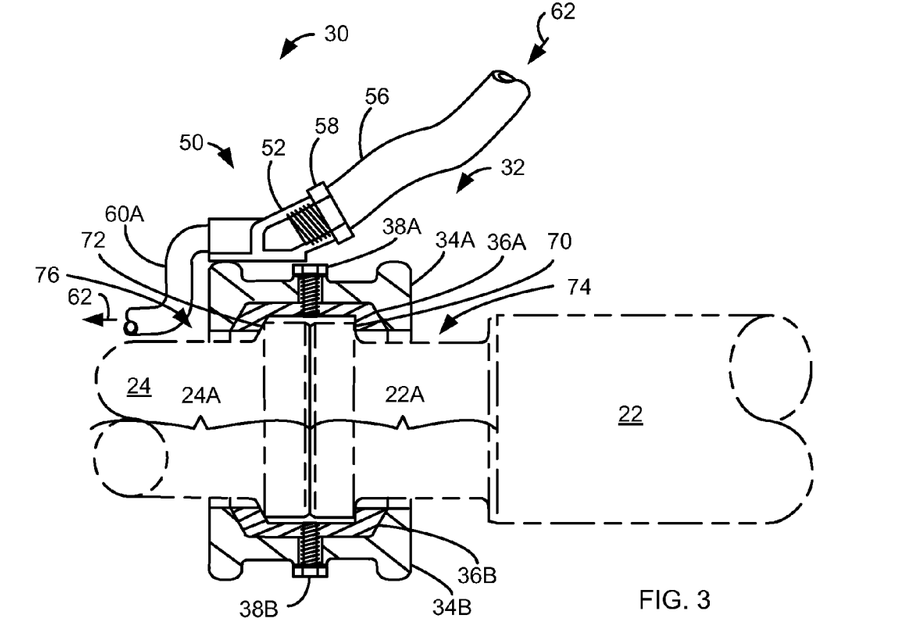
FIG. 3 is a cut-away view of the connector assembly of FIGS. 1 and 2 showing interior details of the connector assembly.

FIG. 2 is a side view of a portion of the mud pump 10 of FIG. 1 including the piston 26, the piston rod 24, the extension rod 22, and the connector assembly 30 connecting the ends of the extension rod 22 and the piston rod 24. FIG. 3 is a cut-away view of the connector assembly 30 of FIGS. 1 and 2 showing interior details of the connector assembly 30. In FIGS. 2 and 3, phantom lines are used to represent an illustrative context for this embodiment of the connector assembly. As shown in FIG. 3, the end of the extension rod 22 (labeled 22A in FIG. 3) and the end of the piston rod 24 (labeled 24A in FIG. 3) are in abutting contact. The connector assembly 30 is installed around the abutting ends 22A and 24A of the extension rod 22 and the piston rod 24, respectively.

In the embodiment of FIGS. 1-3, the connector assembly 30 includes a clamp assembly 32 and a fluid delivery system 50. The clamp assembly 32 compressively couples the abutting ends 22A and 24A of the extension rod 22 and the piston rod 24, respectively, allowing reciprocal motion of the extension rod 22 to be transferred to the piston rod 24. The fluid delivery system 50 delivers a flow of a fluid 62 to a backside surface 64 of the piston 26. The fluid 62 cools and lubricates the piston 26 as the piston 26 moves back and forth within the cylinder liner 20 (see FIG. 1).

In the embodiment of FIGS. 1-3, the clamp assembly 32 includes a pair of outer clamp members 34A and 34B, and a pair of inner clamp members 36A and 36B (see FIG. 3). As described in more detail below, the outer clamp member 34A is adapted to receive the inner clamp member 36A, and the outer clamp member 34B is adapted to receive the inner clamp member 36B. FIG. 3 shows the inner clamp member 36A fit (i.e., installed) in the outer clamp member 34A, and the inner clamp member 36B fit in the outer clamp member 34B. As described in more detail below, each of the inner clamp members 36A and 36B has a pair of opposed inner surfaces, where each of the inner surfaces is adapted to contact a corresponding shoulder of either the end 22A of the extension rod 22 or the end 24A of the piston rod 24.

The outer clamp members 34A and 34B have standard configurations and are suitable for use on mud pumps having different configurations, e.g., pumps from different manufacturers. The inner clamp members 36A and 36B, on the other hand, are replaceable, and configurations of inner surfaces of the inner clamp members 36A and 36B can be changed to match differing configurations of the respective ends 22A and 24A of the extension rod 22 and the piston rod 24. The connector assembly 30 of FIGS. 1-3 may be repaired by simply replacing the inner clamp members 36A and 36B when the inner surfaces of one of the inner clamp members 36A and 36B become damaged or worn.

Because they are standardized, the outer clamp members 34A and 34B can be produced in greater numbers, and hence more cheaply, than would be feasible for customized outer clamp members. Conversely, the inner clamp members, having a simple design, can be constructed inexpensively to match many customized configurations. Several different pairs of the replaceable inner clamp members 36A and 36B may be formed, where each pair is configured to connect ends of mud pump extension rods and piston rods having different configurations. The pair of reusable outer clamp members 34A and 34B is advantageously configured to receive any one of different pairs of replaceable inner clamp members 36A and 36B. A mud pump user having several different models of mud pumps need only keep one or two of the pairs of standard outer clamp members 34A and 34B on hand, along with a sufficient number of the different pairs of replaceable inner clamp members 36A and 36B. As a result, the manufacturing, distribution, and stocking costs associated with the connector assembly 30 of FIGS. 1-3 are substantially reduced over those of known connector assemblies.

The outer clamp members 34A and 34B may be, for example, formed using a casting process (e.g., investment casting, die casting, or sand casting) followed by one or more machining or metalworking operations. Suitable materials for the outer clamp members 34A and 34B include carbon alloy steel and precipitation hardening stainless steel. More specifically, carbon alloy steel with a carbon content of from about 0.3% to approximately 0.4% is believed to have sufficient strength. Precipitation hardening stainless steels containing from about 15% to approximately 17% chromium, and from about 4% to approximately 5% nickel, are believed to have sufficient strength.

The inner clamp members 36A and 36B may be, for example, formed by cutting suitably sized pieces from lengths of common metal stock (e.g., bar stock or tube stock), and performing one or more machining or metalworking operations on the pieces. Carbon alloy steel is a suitable material for the inner clamp members 36A and 36B. More specifically, carbon alloy steel with a carbon content of from about 0.3% to approximately 0.4% is believed to have sufficient strength.

In the embodiment of FIGS. 1-3, the end 22A of the extension rod 22 has a perpendicular shoulder 70, and the end 24A of the piston rod 24 has a sloping shoulder 72 (see FIG. 3). That is, an outer surface of the shoulder 70 of the end 22A of the extension rod 22 forms an angle of 90 degrees with respect to an axis of the extension rod 22, and an outer surface of the shoulder 72 of the end 24A of the piston rod 24 forms an angle of less than 90 degrees with respect to an axis of the extension rod 22. For reasons that will become clear, effectiveness of the clamp assembly is improved when at least one of the ends of two rods connected using the clamp assembly 32 has a sloping shoulder.

In the embodiment of FIG. 3, a machine screw 38A retains the inner clamp member 36A in the outer clamp member 34A, and another machine screw 38B retains the inner clamp member 36B in the outer clamp member 34B. As described below, other means for retaining the inner clamp members 36A and 36B in the outer clamp members 34A and 34B are possible and contemplated.

In the embodiment of FIGS. 1 and 2, the connector assembly 30 is installed around the respective ends 22A and 24A of the extension rod 22 and the piston rod 24 via a pair of bolts and a pair of nuts that urge the outer clamp members 34A and 34B toward one another. One of the two bolts is labeled 44A in FIG. 2, and one of the two nuts is labeled 46A in FIG. 2. The outer clamp member 34A has a flange 40A extending from one side, and the outer clamp member 34B has a flange 42A extending from an adjacent side. In FIG. 2, the bolt 44A passes through holes in the flanges 40A and 42A, and the nut 46A is tightened on a threaded shaft of the bolt 44A.

When the inner clamp members 36A and 36B are installed in the outer clamp members 34A and 34B, the inner surfaces of the inner clamp members 36A and 36B are placed in contact with the outer surfaces of the shoulder 70 of the end 22A of the extension rod 22 and the shoulder 72 of the end 24A of the piston rod 24. The bolt 44A is passed through holes in the flanges 40A and 42A, and the other bolt is passed through holes in flanges extending from opposite sides of the outer clamp members 34A and 34B. The nut 46A is threaded onto the bolt 44A and tightened, urging the flanges 40A and 42A toward one another. Similarly, the other nut is threaded onto the other bolt and tightened, urging the flanges on the opposite sides of the outer clamp members 34A and 34B toward one another. When the outer clamp members 34A and 34B are urged toward one another in this way, the inner surfaces of the inner clamp members 36A and 36B apply forces to the outer surfaces of the shoulders 70 and 72 that urge the ends 22A and 24A of the extension rod 22 and the piston rod 24 toward one another.

In the embodiment of FIG. 3, the end 22A of the extension rod 22 has a perpendicular shoulder 70, and the end 24A of the piston rod 24 has a sloping shoulder 72. When the outer clamp members 34A and 34B are urged toward one another, forces are generated where the inner surfaces of the inner clamp members 36A and 36B contact the outer surface of the sloping shoulder 72 of the end 24A of the piston rod 24. Due to the sloping outer surface of the shoulder 72, the forces have components that are directed parallel to an axis of the piston rod 24 and toward the end 22A of the extension rod 22. Equal and opposite forces are generated where the inner surfaces of the inner clamp members 36A and 36B contact the outer surface of the shoulder 70 of the end 22A of the extension rod 22, directed parallel to an axis of the extension rod 22 and toward the end 24A of the piston rod 24. These opposing forces urge the ends 22A and 24A of the extension rod 22 and the piston rod 24 toward one another.

As described in detail below, other means for urging the outer clamp members 34A and 34B toward one another are possible and contemplated. It is also noted that a hole in one or more of the flanges on opposite sides of the outer clamp members 34A and 34B may be threaded to receive a threaded shaft of a bolt used to urge the outer clamp members 34A and 34B toward one another, eliminating the need for a corresponding nut.

In the embodiments of FIGS. 1-3, the fluid delivery system 50 includes a water jacket 52, a pair of machine screws including a machine screw 54A used to attach the water jacket 52 to an upper portion of the outer clamp member 34A, a hose 56 having a coupling 58 installed at one end, and two tubes extending from the water jacket 52 including a tube 60A. The hose 56 is connected to the water jacket 52 via the coupling 58, and delivers the flow of fluid 62 to the water jacket 52. The two tubes including the tube 60A extend from the water jacket 52 toward an end of the piston rod 24 opposite the end 24A, and provide the fluid 62 to the backside surface 64 of the piston 26 (see FIG. 2). It is noted that other embodiments of the fluid delivery system 50 of FIGS. 2-3 may include a single tube, or more than two tubes, for providing the fluid 62 to the backside surface 64 of the piston 26.

The water jacket 52, the pair of machine screws including the machine screw 54A used to attach the water jacket 52 to an upper portion of the outer clamp member 34A, the coupling 58, and the two tubes extending from the water jacket 52, including the tube 60A, are preferably formed from a corrosion-resistant metal such as stainless steel. Dimensions of openings and passages in the water jacket 52, the coupling 58, and the two tubes extending from the water jacket 52, including the tube 60A, through which the fluid 62 flows are sized to provide desired flow rates of the fluid 62.

In the embodiments of FIGS. 1-3, the hose 56 is a flexible hose, advantageously allowing the water jacket 52, and the two tubes including the tube 60A that extend from the water jacket 52, to move back and forth with the piston rod 24 and the attached piston 26. This ensures that the fluid 60 is delivered to the backside 64 of the piston 26 through a full range of motion of the piston 26. The hose 56 may be, for example, a hydraulic hose having an inner tube, one or more reinforcement layers over the inner tube, and an outer cover. The inner tube and the outer cover may be, for example, formed from a synthetic rubber. Each of the one or more reinforcement layers may include, for example, a fiber braid. The coupling 58 may be, for example, a crimped coupling with tapered threads (e.g., National Pipe Thread or NPT tapered threads).

As shown in FIG. 3, the end 22A of the extension rod 22 has an annular recess 74 about an outer surface, and the shoulder 70 of the end 22A forms a sidewall of the annular recess 74. The end 24A of the piston rod 24 has an annular recess 76 about an outer surface, and the shoulder 72 of the end 24A forms a sidewall of the annular recess 76. The annular recess 74 forms a securing region with a decreased radius relative to the end 22A of the extension rod 22, and the annular recesses 76 forms a securing region with a decreased radius relative to the end 24A of the piston rod 24.

Described in a different way, the replaceable inner clamp members 36A and 36B may be referred to as replaceable clamp liners. The reusable outer clamp members 34A and 34B, along with the pair of bolts and the pair of nuts used to urge the outer clamp members 34A and 34B toward one another, may be considered a universal clamp frame used to urge the clamp liners inward, and to retain the clamp liners in place around the abutting respective ends 22A and 24A of the extension rod 22 and the piston rod 24. The inner surfaces of the inner clamp members 36A and 36B are adapted to mate with the securing region 74 of the end 22A of the extension rod 22, and with the securing region 76 of the end 24A of the piston rod 24, so as to retain the ends 22A and 24A in abutting relation when the clamp liners are urged inward. The universal clamp frame is adapted to receive interchangeable clamp liners that match different securing region profiles.

It is noted that the clamp assembly 32 of the connector assembly 30 of FIGS. 1-3 may be formed using more than two outer clamp members and/or more than two inner clamp members.

Figure 4:
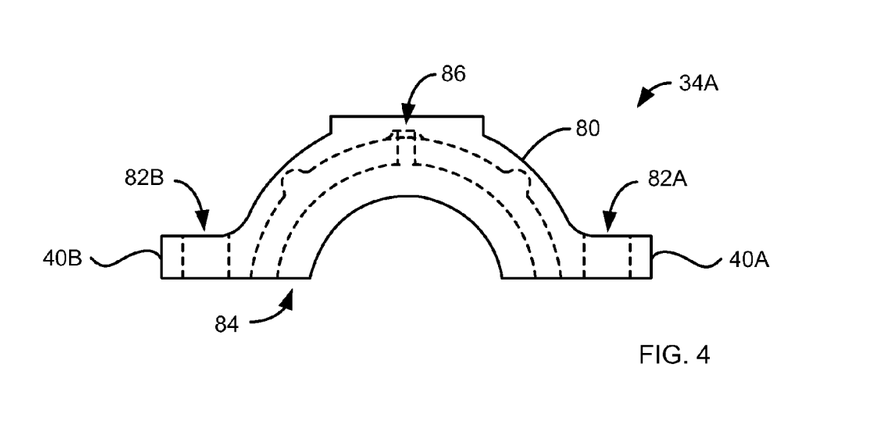
FIG. 4 is a side view of one embodiment of one of a pair of outer clamp members of the connector assembly of FIGS. 1-3.

FIG. 4 is a side view of one embodiment of the outer clamp member 34A of the connector assembly 30 of FIGS. 1-3. In FIG. 4, dashed lines are used to represent edges of features that are hidden from view. In the embodiment of FIG. 4, the outer clamp member 34A includes an arcuate body 80. The flange 40A (see FIG. 2) extends from one side of the body 80, and a flange 40B extends from an opposite side of the body 80. The flange 40A includes a hole 82A extending therethrough and adapted to receive a threaded shaft of the bolt 44A (see FIG. 2). The flange 40B includes a hole 82B extending therethrough and adapted to receive a threaded shaft of the other bolt. The body 80 has a channel 84 adapted to receive the inner clamp member 36A (see FIG. 3), and has a hole 86 to receive a threaded shaft of the machine screw 38A used to retain the inner clamp member 36A in the channel 84.

Referring back to FIG. 3, the inner clamp member 36A is shown installed in the channel 84 of the body 80 of the outer clamp member 34A. The channel 84 has two opposed and sloping sidewalls, and the inner clamp member 36A has outer sidewalls that conform to the sloping sidewalls of the channel 84. Each of the sidewalls of the channel 84 preferably forms an acute angle of about 22.5 degrees with respect to a plane perpendicular to an axis of the arcuate body 80.

Figure 5:
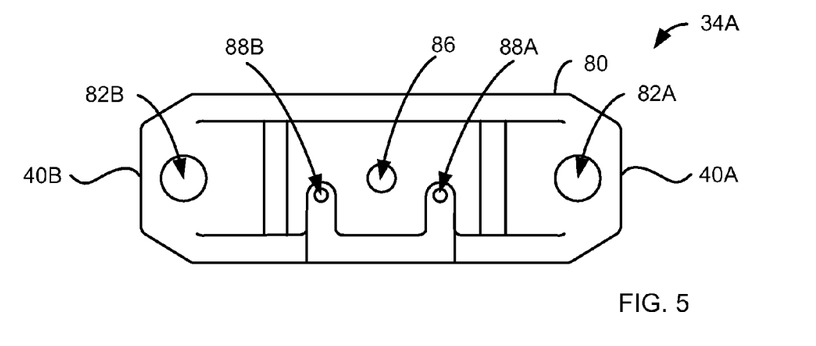
FIG. 5 is a top view of the outer clamp member of FIG. 4.

FIG. 5 is a top view of the outer clamp member 34A of FIG. 4. Shown in FIG. 5 are threaded holes 88A and 88B adapted to receive the machine screw 54A (see FIG. 2) and the other machine screw, respectively, that are used to attach the water jacket 52 to the upper portion of the outer clamp member 34A.

Figure 6:
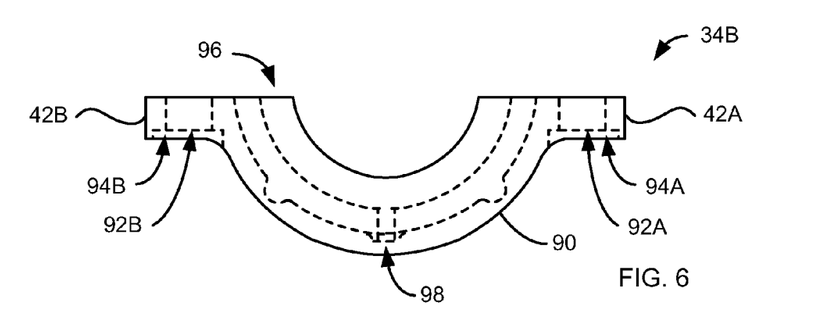
FIG. 6 is a side view of one embodiment of the other of the pair of outer clamp members of the connector assembly of FIGS. 1-3.
Figure 7:
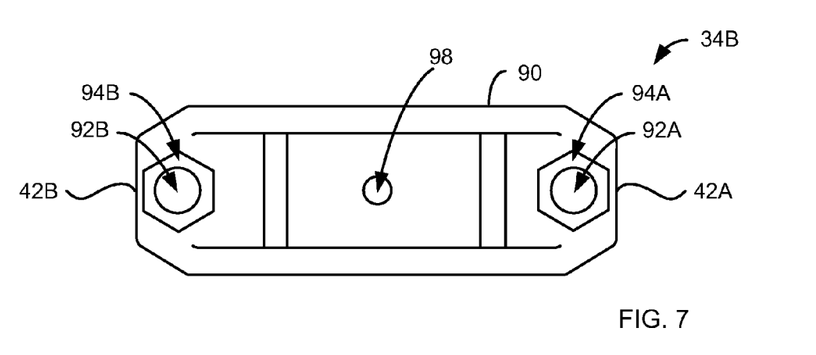
FIG. 7 is a bottom view of the outer clamp member of FIG. 6.

FIG. 6 is a side view of one embodiment of the outer clamp member 34B of the connector assembly 30 of FIGS. 1-3, and FIG. 7 is a bottom view of the outer clamp member 34B of FIG. 6. In FIG. 6, dashed lines are used to represent edges of features that are hidden from view. In the embodiment of FIGS. 6 and 7, the outer clamp member 34B includes an arcuate body 90. The flange 42A (see FIG. 2) extends from one side of the body 90, and a flange 42B extends from an opposite side of the body 90. The flange 42A includes a hole 92A extending therethrough and adapted to receive the threaded shaft of the bolt 44A (see FIG. 2), and a recess 94A formed around the hole 92A adapted to advantageously receive and engage a hexagonal head of the bolt 44A. The flange 42B includes a hole 92B extending therethrough and adapted to receive a threaded shaft of the other bolt, and a recess 94B formed around the hole 92B adapted to advantageously receive and engage a hexagonal head of the other bolt. The body 90 has a channel 96 adapted to receive the inner clamp member 36B (see FIG. 2), and a hole 98 to receive a threaded shaft of the machine screw 38B (see FIGS. 2 and 3) used to retain the inner clamp member 36B in the channel 96.

When the heads of the bolt 44A and the other bolt are positioned in the respective recesses 94A and 94B, sidewalls of the recesses 94A and 94B engage outer surfaces of the hexagonal heads such that the bolt 44A and the other bolt are prevented from turning about their axes. This aids in tightening the nut 46A on the bolt 44A, and the other nut on the other bolt.

Referring back to FIG. 3, the inner clamp member 36B is shown installed in the channel 96 of the body 90 of the outer clamp member 34B. The channel 96 has two opposed and sloping sidewalls, and the inner clamp member 36B has outer sidewalls that conform to the sloping sidewalls of the channel 96. Each of the sidewalls of the channel 96 preferably forms an acute angle of about 22.5 degrees with respect to a plane perpendicular to an axis of the arcuate body 90.

Figure 8:
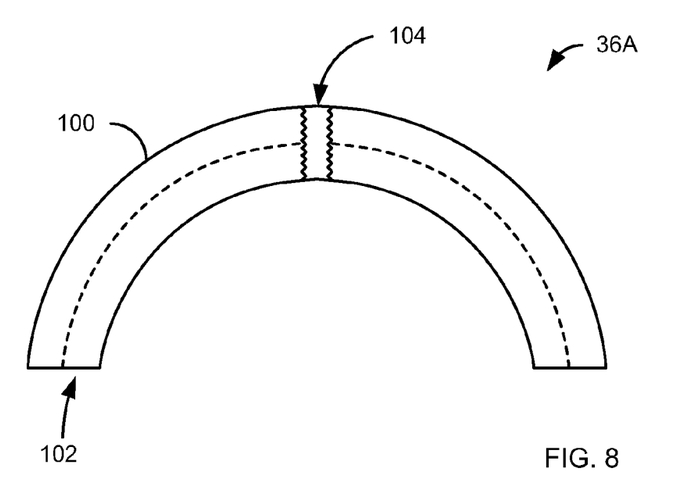
FIG. 8 is a side view of one embodiment of one of a pair of inner clamp members of the connector assembly of FIGS. 1-3.
Figure 9:
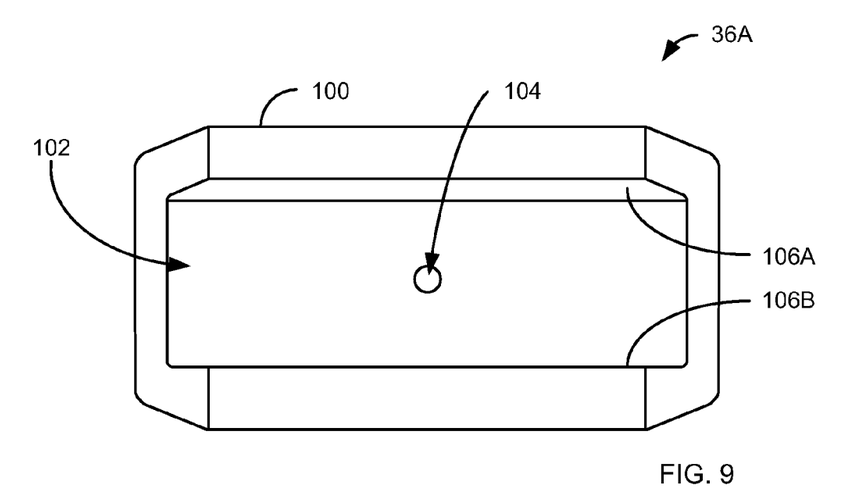
FIG. 9 is a bottom view the inner clamp member of FIG. 8.

FIG. 8 is a side view of one embodiment of the inner clamp member 36A of the connector assembly 30 of FIGS. 1-3, and FIG. 9 is a bottom view the inner clamp member 36A of FIG. 8. In FIG. 8, dashed lines are used to represent edges of features that are hidden from view. In the embodiment of FIGS. 8 and 9, the inner clamp member 36A has an arcuate body 100 having a channel 102 with the opposed inner surfaces described above, and a threaded hole 104 adapted to receive a threaded shaft of the machine screw 38A used to retain the inner clamp member 36A in the outer clamp member 34A (see FIGS. 2 and 3). As shown in FIG. 9, the channel 102 has opposed inner surfaces 106A and 106B. The inner surface 106A is adapted to conform to the outer surface of the sloping shoulder 72 of the end 24A of the piston rod 24 (see FIG. 3). For example, the inner surface 106A may have a slope that matches a slope of the sloping shoulder 72 of the end 24A of the piston rod 24. The inner surface 106B is adapted to conform to the outer surface of the perpendicular shoulder 70 of the end 22A of the extension rod 22 (see FIG. 3). The channel 102 is adapted such that when the end 22A of the extension rod 22 and the end 24A of the piston rod 24 are in abutting contact as in FIGS. 1-3, the channel 102 fits over the abutting ends 22A and 24A such that the inner surface 106A contacts the outer surface of the sloping shoulder 72 of the end 24A, and the inner surface 106B contacts the outer surface of the perpendicular shoulder 70 of the end 22A (see FIG. 3). The inner clamp member 36B of FIGS. 1-3 is configured similarly.

Figure 10:
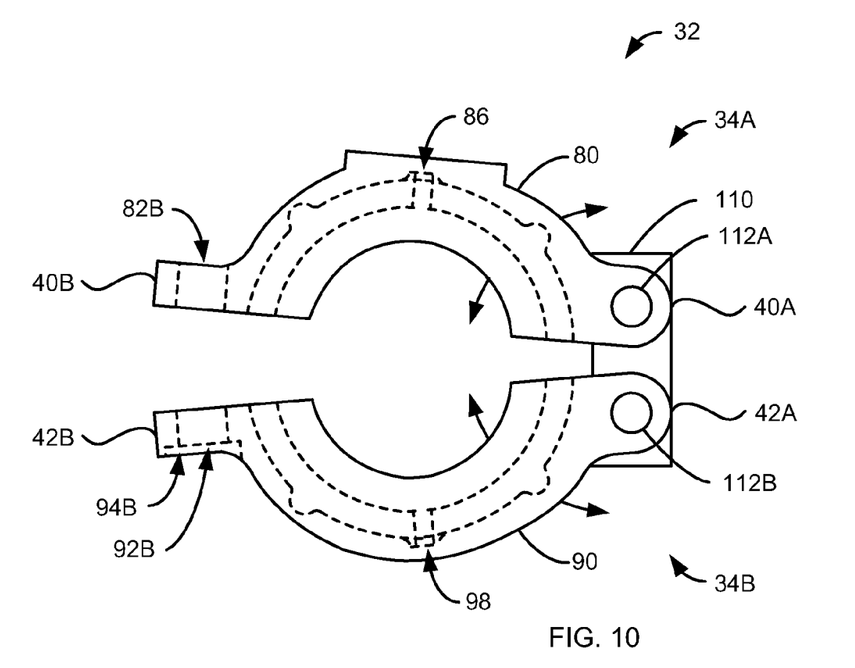
FIG. 10 is a side view of an alternate embodiment of a clamp assembly of the connector assembly of FIGS. 1-3.

FIG. 10 is a side view of an alternative embodiment of the clamp assembly 32 of the connector assembly 30 of FIGS. 1-3. In FIG. 10, dashed lines are used to represent edges of features that are hidden from view. In the embodiment of FIG. 10, the flanges 40A and 42A of the respective outer clamp members 34A and 34B are connected together via a bar 110 and a pair of pins 112A and 112B. The pin 112A connects the outer clamp member 34A to one end of the bar 110, and the pin 112B connects the outer clamp member 34B to an opposite end of the bar 110. The bar 110, along with the pins 112A and 112B, may be considered a hinge mechanism that connects the outer clamp members 34A and 34B. As indicated in FIG. 10, the outer clamp member 34A can pivot about the pin 112A, and the outer clamp member 34B can pivot about the pin 112B. As a result, the outer clamp members 34A and 34B can be separated by moving the flanges 40B and 42B away from each other, and the outer clamp members 34A and 34B can be brought together by moving the flanges 40B and 42B toward one another.

During installation of the clamp assembly 32 of FIG. 10, a bolt is passed through the holes 82B and 92B in the respective flanges 40B and 42B, and a nut is threaded onto a threaded shaft of the bolt and tightened, urging the flanges 40B and 42B toward each other, and also urging the flanges 40A and 42A toward each other. When the outer clamp members 34A and 34B are urged toward one another in this way, the inner surfaces of the inner clamp members 36A and 36B apply forces to the outer surfaces of the shoulders 70 and 72 of the ends 22A and 24A of the extension rod 22 and the piston rod 24 (see FIG. 3) that urge the ends 22A and 24A toward one another.

Figure 11:
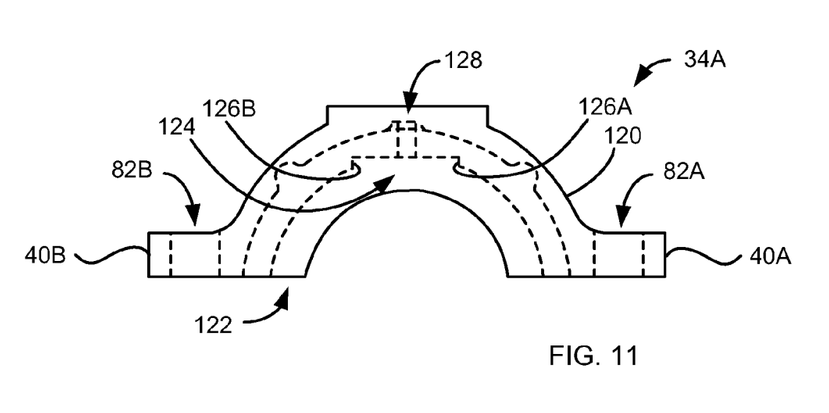
FIG. 11 is a side view of an alternate embodiment of the outer clamp member of FIGS. 1-5.
Figure 12:
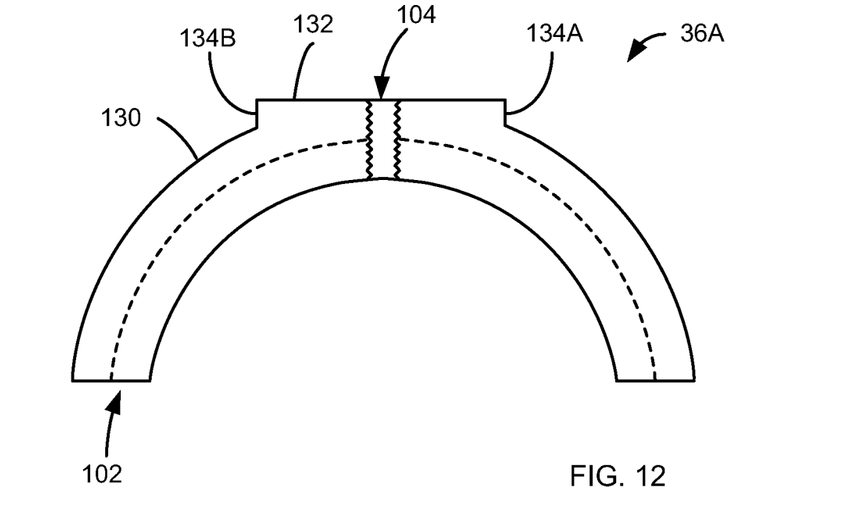
FIG. 12 is a side view of an alternate embodiment of the inner clamp member of FIGS. 1-3 and 8-9.

FIG. 11 is a side view of an alternative embodiment of the outer clamp member 34A of FIGS. 1-5, and FIG. 12 is a side view of an alternative embodiment of the inner clamp member 36A of FIGS. 1-3 and 8-9. In FIGS. 11 and 12, dashed lines are used to represent edges of features that are hidden from view. In the embodiment of FIG. 11, the outer clamp member 34A includes an arcuate body 120 with the flanges 40A and 40B extending from opposite sides. The flange 40A includes the hole 82A for receiving the threaded shaft of the bolt 44A, and the flange 40B includes the hole 82B for receiving the threaded shaft of the other bolt.

In the embodiment of FIG. 12, the inner clamp member 36A has an arcuate body 130 with the channel 102 having the opposed inner surfaces 106A and 106B (see FIG. 9) adapted to contact the corresponding shoulders 70 and 72 of the ends 22A and 24A of the extension rod 22 and the piston rod 24 (see FIG. 3). The body 130 also includes a retainer member 132 for retaining the inner clamp member 36A in the outer clamp member 34A of FIG. 11. The retainer member 132 extends from an outer surface of the body 130 and has a pair of opposed walls 134A and 134B that jut out from the outer surface of the body 130.

Referring back to FIG. 11, the body 120 of the outer clamp member 34A includes a channel 122 adapted to receive the inner clamp member 36A. The channel 122 includes a recess 124 adapted to receive the retainer member 132 of the inner clamp member 36A of FIG. 12. The recess 124 includes opposed sidewalls 126A and 126B adapted to contact the opposed walls 134A an 134B of the retainer member 132 (see FIG. 12). When the inner clamp member 36A of FIG. 12 is installed in the outer clamp member 34A of FIG. 11, the opposed walls 134A an 134B of the retainer member 132 contact the opposed sidewalls 126A and 126B of the recess 124, preventing the inner clamp member 36A from moving within the channel 122 of the outer clamp member 34A.

The body 120 of the outer clamp member 34A of FIG. 11 has a hole 128 allowing access to the installed inner clamp member 36A. A cylindrical rod (e.g., an end of a punch) may be inserted in the hole 128 such that one end of the rod contacts the retainer member 132 of the installed inner clamp member 36A. A force may be applied to an opposite side of the rod to dislodge the inner clamp member 36A from the channel 122 of the outer clamp member 34A of FIG. 11.

Figure 13:
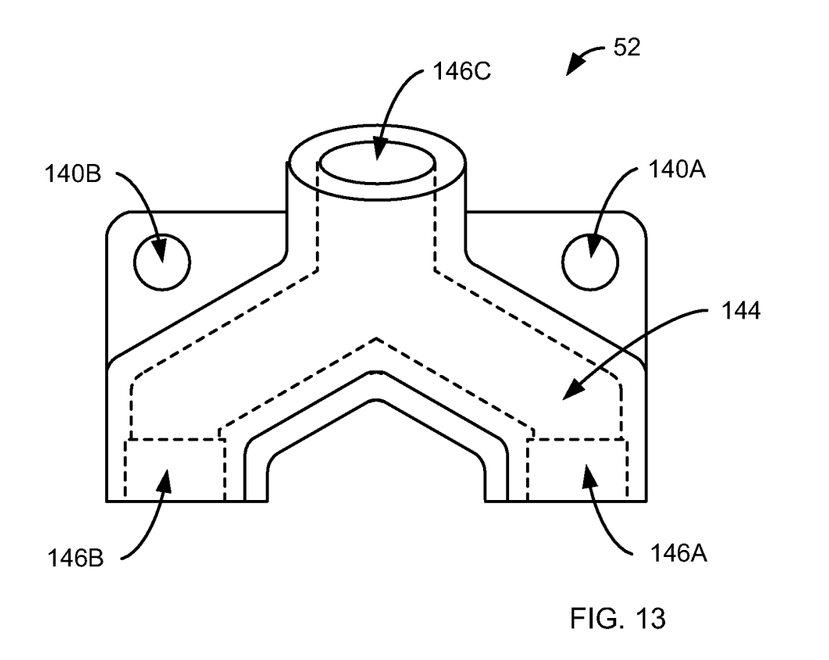
FIG. 13 is a top view of one embodiment of a water jacket of the connector assembly of FIGS. 1-3.

FIG. 13 is a top view of one embodiment of the water jacket 52 of the connector assembly 30 of FIGS. 1-3. In FIG. 13, dashed lines are used to represent edges of features that are hidden from view. In the embodiment of FIG. 13, the water jacket 52 includes holes 140A and 140B extending therethrough and adapted to receive threaded shafts of the machine screw 54A and the other machine screw, respectively. The water jacket 52 also includes a passage 144 for containing the flow of the fluid 62 (see FIGS. 2-3). The passage 144 extends between a port 146A, a port 146B, and a port 146C. The port 146C is threaded to receive a threaded end of the coupling 58 (see FIGS. 2-3). The port 146A is adapted to receive an end of the tube 60A (see FIGS. 2-3), and the port 146B is adapted to receive an end of the other tube used to provide the fluid 62 to the backside surface 64 of the piston 26 (see FIG. 2).

Figure 14:
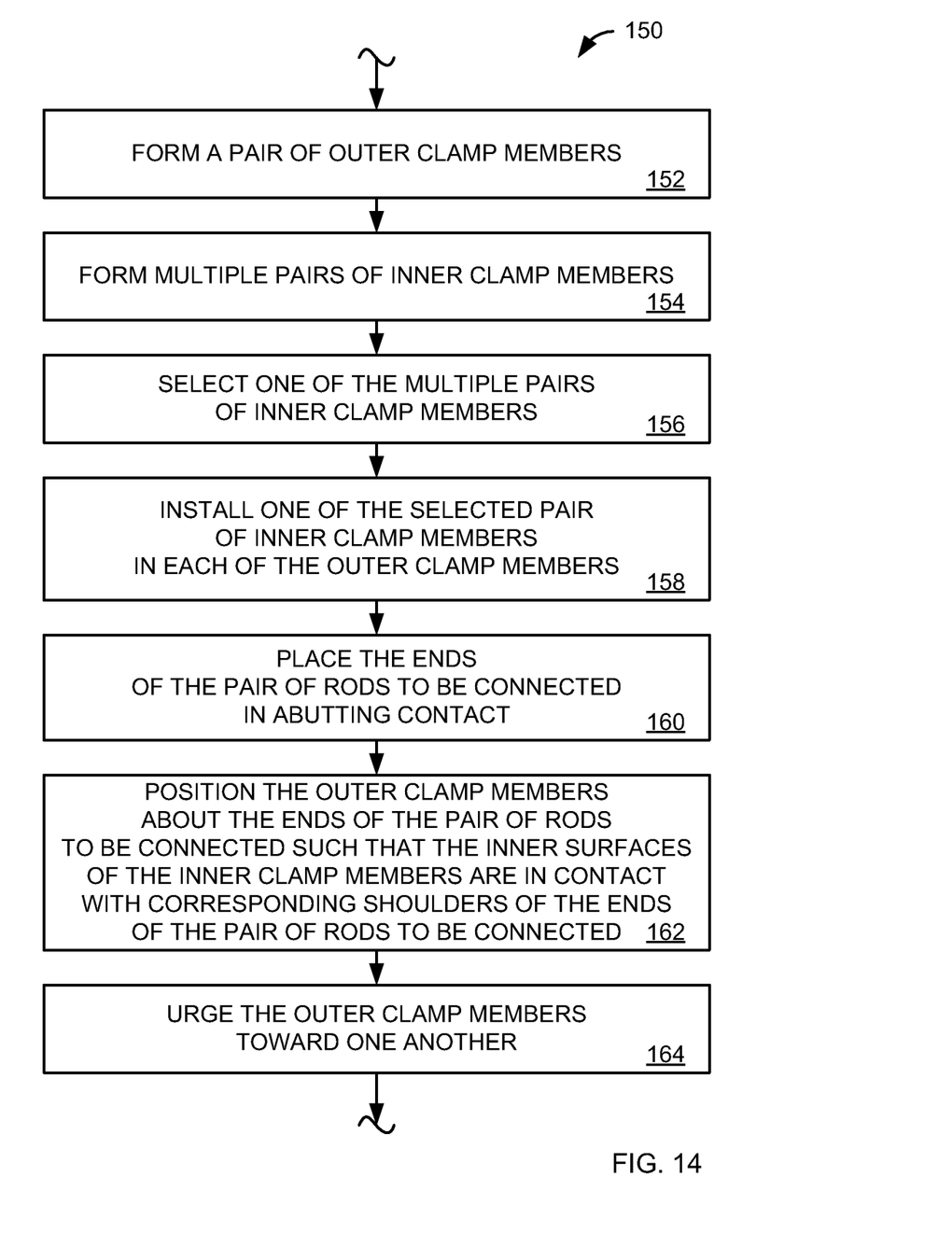
FIG. 14 is a flow chart of one embodiment of a method for connecting ends of a pair of rods.

FIG. 14 is a flow chart of one embodiment of a method 150 for connecting ends of a pair of rods (e.g., the ends 22A and 24A of the extension rod 22 and the piston rod 24 of FIGS. 1-3). During a step 152 of the method 150, a pair of outer clamp members (e.g., the outer clamp members 34A and 34B of FIGS. 1-3) are formed. For example, the outer clamp members may be formed using a casting process (e.g., investment casting, die casting, or sand casting) followed by one or more machining or metalworking operations. Although the initial casting mold design can require a significant investment of time and money, this expense can be pro-rated over a large number of identical mass-manufactured products.

During a step 154, multiple pairs of inner clamp members (e.g., the inner clamp members 36A and 36B of FIG. 3) are formed. The inner clamp members may be inexpensively formed, for example, by cutting pieces from lengths of common metal stock (e.g., bar stock or tube stock), and performing one or more machining or metalworking operations on the pieces. Each of the inner clamp members has a pair of opposed inner surfaces adapted to contact shoulders of ends of rods placed in abutting contact. The opposed inner surfaces of at least two of the pairs of inner clamp members are adapted to conform to shoulders of ends of rods having different configurations. For example, the opposed inner surfaces of one of the pairs of inner clamp members may be adapted to conform to shoulders of ends of rods where one of the shoulders is a perpendicular shoulder, and the other shoulder is a sloping shoulder. The opposed inner surfaces of another of the pairs of inner clamp members may be adapted conform to shoulders of ends of rods where both of the shoulders are sloping shoulders.

During a step 156, one of the multiple pairs of inner clamp members is selected dependent upon configurations of shoulders of the ends of the pair of rods to be connected. For example, if one of the ends of the pair of rods to be connected has a perpendicular shoulder, and the other end has a sloping shoulder, a pair of inner clamp members with inner surfaces adapted conform to shoulders of ends of rods where one of the shoulders is a perpendicular shoulder, and the other shoulder is a sloping shoulder, is selected. Alternately, if both of the ends of the pair of rods to be connected have sloping shoulders, a pair of inner clamp members with inner surfaces adapted conform to shoulders of ends of rods where both shoulders are sloping shoulder is selected.

During a step 158, one of the selected pair of inner clamp members is installed in each of the outer clamp members. The ends of the pair of rods to be connected are placed in abutting contact during a step 160. During a step 162, the outer clamp members are positioned about the ends of the pair of rods to be connected such that the inner surfaces of the inner clamp members are in contact with corresponding shoulders of the ends of the pair of rods to be connected. The outer clamp members are urged toward one another during a step 164.

The method 150 may also include attaching a fluid delivery system (e.g., the fluid delivery system 50 of FIGS. 2-3) to one of the outer clamp members. The fluid delivery system may be connected to a source of a first fluid. One of the connected rods may be driven to pump a second fluid (e.g., drilling fluid).

Numerous variations and modifications will become apparent to those skilled in the art once the above disclosure is fully appreciated. It is intended that the following claims be interpreted to embrace all such variations and modifications.

What is claimed is:

1. A connector assembly positioned about abutting ends of an extension rod and a piston rod of a reciprocating pump, the connector assembly comprising:
   a pair of outer clamp members and a pair of removable inner clamp members;
   wherein each of the outer clamp members receives one of the removable inner clamp members;
   wherein each of the inner clamp members has a pair of opposed inner surfaces, with one of said inner surfaces contacting a shoulder on the end of the piston rod and the other of said inner surfaces contacting a shoulder on the end of the extension rod;
   means for urging the outer clamp members toward one another, said means causing the inner surfaces of the inner clamp members to impart forces on the corresponding shoulders of the ends of the rods that urge the ends of the rods toward one another to enable a transfer of reciprocating motion from the extension rod to the piston rod; and
   a manifold bolted on to at least one of the outer clamp members to direct a fluid stream generally parallel to an axis of the abutting rod ends.

2. The connector assembly as recited in claim 1, wherein the extension rod and the piston rod are each substantially cylindrical.

3. The connector assembly as recited in claim 1, wherein the outer clamp members accept interchangeable inner clamp members, the different inner clamp members being shaped to connect abutting ends of pairs of rods having different configurations.

4. The connector assembly as recited in claim 1, wherein the connector assembly is repairable by replacing the inner clamp members when the inner surfaces of one of the inner clamp members become damaged or worn.

5. The connector assembly of claim 4, wherein the inner clamp members are reusable.

6. The connector assembly as recited in claim 1, wherein the means for urging the outer clamp members toward one another comprises a bolt fastener.

7. The connector assembly as recited in claim 1, further comprising: fasteners that retain the inner clamp members within the outer clamp members.

8. An assembly that connects abutting ends of an extension rod and a piston rod of a reciprocating pump, said ends each having a securing region with a decreased radius relative to the ends of said rods, the assembly comprising:
   a plurality of removable clamp liners each having an inner surface mating concurrently with the securing regions of both the extension rod and the piston rod so as to retain the rod ends in abutting relation when said clamp liners are urged inward; and
   a universal clamp frame that urges the clamp liners inward to enable the extension rod to transfer reciprocating motion to the piston rod,
   wherein the universal clamp frame has a bolt-on manifold to direct a fluid stream generally parallel to an axis of the abutting rod ends.

9. The assembly of claim 8, wherein the inner surfaces of the liners each have a first profile and the liners are replaceable with another set of liners each having a second profile that differs in shape from the first profile.

10. The assembly of claim 9, wherein the universal clamp frame is formed by investment casting, and wherein the removable clamp liners are formed by machining tubing stock.

11. The assembly of claim 9, wherein the universal clamp frame comprises:
    a pair of outer clamp members that, when secured together, retain the plurality of removable clamp liners in place around the abutting rod ends; and
    one or more bolts to secure the pair of outer clamp members together.

12. The assembly of claim 11, wherein the universal clamp frame further comprises a hinge that connects the pair of outer clamp members.

13. The assembly of claim 11, wherein the removable clamp liners are attached to the outer clamp members before the outer clamp members are secured together.

14. The assembly of claim 13, wherein each removable clamp liner is attached by at least one screw.

15. The assembly of claim 8, wherein at least one of the securing regions includes a sloping shoulder, and wherein the liners include opposing inner surfaces, one of which matches the slope of said sloping shoulder.

16. The assembly of claim 8, wherein the clamp liners are reusable.

* * * * *